US012368220B2

(12) United States Patent
Fang et al.

(10) Patent No.: US 12,368,220 B2
(45) Date of Patent: Jul. 22, 2025

(54) PHASE SHIFTER, ANTENNA AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Jia Fang, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/018,925

(22) PCT Filed: Feb. 21, 2022

(86) PCT No.: PCT/CN2022/077014

§ 371 (c)(1),
(2) Date: Jan. 31, 2023

(87) PCT Pub. No.: WO2023/155185

PCT Pub. Date: Aug. 24, 2023

(65) Prior Publication Data

US 2024/0275008 A1 Aug. 15, 2024

(51) Int. Cl.
*H01P 1/18* (2006.01)
*H01Q 3/36* (2006.01)

(52) U.S. Cl.
CPC ............... *H01P 1/182* (2013.01); *H01Q 3/36* (2013.01)

(58) Field of Classification Search
CPC ............ H01Q 3/36; H01Q 1/22; H01Q 1/241; H01Q 3/44; H01Q 1/38; H01Q 3/34;
(Continued)

(56) References Cited

U.S. PATENT DOCUMENTS 12,183,987 B2 * 12/2024 Cui .......................... H01Q 3/36
2014/0043189 A1 2/2014 Lee et al.
(Continued)

FOREIGN PATENT DOCUMENTS

CN 105308789 A 2/2016
CN 109193081 A 1/2019
(Continued)

OTHER PUBLICATIONS

Junqing Wang, "A research of terahertz phase shifting properties based on new materials," Master's Theses, Apr. 1, 2020, U. of Electronic Sci. & Tech. of China, Hefei, Anhui, China. English Abstract.
(Continued)

*Primary Examiner* — John W Poos
(74) *Attorney, Agent, or Firm* — HOUTTEMAN LAW LLC

(57) ABSTRACT

The present disclosure provides a phase shifter, an antenna and an electronic device. The phase shifter includes: a first dielectric substrate and a second dielectric substrate arranged opposite to each other, and an adjustable dielectric layer, a first electrode and a second electrode arranged between the first dielectric substrate and the second dielectric substrate, where the first electrode and the second electrode each extend in a first direction, and at least one of the first electrode and the second electrode includes a first sub-electrode and a second sub-electrode; the first sub-electrode is arranged on a side of the first dielectric substrate close to the adjustable dielectric layer, and the second sub-electrode is arranged on a side of the second dielectric substrate close to the adjustable dielectric layer, orthographic projections of the first sub-electrode and the second sub-electrode on the first dielectric substrate are partially overlapped with each other.

19 Claims, 7 Drawing Sheets

(58) Field of Classification Search
CPC ............. H01Q 15/002; H01Q 15/0086; H01Q 19/185; H01Q 21/06; H01Q 21/24; H01Q 3/38; H01Q 9/0407; H01Q 9/16; H01Q 1/24; H01Q 21/0087; H01Q 21/064; H01Q 21/065; H01Q 21/08; H01Q 9/0485; H01P 1/184; H01P 1/18; H01P 1/182; H01P 11/00; H01P 3/003
See application file for complete search history.

(56) References Cited

U.S. PATENT DOCUMENTS

| | | | | |
|---|---|---|---|---|
| 2016/0006092 | A1 | 1/2016 | Ueda et al. | |
| 2022/0140457 | A1* | 5/2022 | Wang | H01P 9/006 333/161 |
| 2022/0140800 | A1* | 5/2022 | Fang | H01P 1/18 343/850 |
| 2024/0369881 | A1* | 11/2024 | Zhong | G02F 1/133555 |

FOREIGN PATENT DOCUMENTS

| | | | |
|---|---|---|---|
| CN | 110658646 | A | 1/2020 |
| CN | 111293384 | A | 6/2020 |
| CN | 111864317 | A | 10/2020 |
| CN | 212033245 | U | 11/2020 |
| CN | 112448105 | A | 3/2021 |
| CN | 113728512 | A | 11/2021 |

OTHER PUBLICATIONS

Yu et al., "Distributed ferroelectric phase shifter with slots periodically inserted into ground," Electronics Letters, Jan. 31, 2008, vol. 44, No. 3, 3 pages.

Karabey et al., "Tunable loaded line phase shifters for microwave applications," Conference Paper, 2011 IEEE MTT-S International Microwave Symposium, Jul. 31, 2011, Pub. by Institute of Electrical and Electronics Engineers Inc., <ieexplore.ieee.org>.

* cited by examiner

PHASE SHIFTER, ANTENNA AND ELECTRONIC DEVICE

TECHNICAL FIELD

The disclosure relates to the field of communication technology, and particularly relates to a phase shifter, an antenna and an electronic device.

BACKGROUND

In an existing structure of a liquid crystal phase shifter, a periodical patch capacitor loading is introduced onto an upper glass substrate after the upper glass substrate is aligned and assembled with an opposite substrate, and adjustment of a variable capacitor is realized by driving liquid crystal molecules to deflect by adjusting a difference between voltages applied to two metal plates in different planes, so that different characteristics of liquid crystal material is obtained, and a capacitance value of the capacitor is changed accordingly. Since a coplanar waveguide (CPW) structure has a ground electrode and a signal electrode in a same plane, a connection can be easily designed, and it is not required to punch holes in glass.

SUMMARY

The present disclosure is directed to solve at least one problem in the related art, and provides a phase shifter, an antenna and an electronic device.

In a first aspect, an embodiment of the present disclosure provides a phase shifter, which includes: a first dielectric substrate and a second dielectric substrate arranged opposite to each other, and an adjustable dielectric layer, a first electrode and a second electrode which are arranged between the first dielectric substrate and the second dielectric substrate, where the first electrode and the second electrode each extend in a first direction, and at least one of the first electrode and the second electrode includes a first sub-electrode and a second sub-electrode;

the first sub-electrode is arranged on a side of the first dielectric substrate close to the adjustable dielectric layer, and the second sub-electrode is arranged on a side of the second dielectric substrate close to the adjustable dielectric layer, orthographic projections of the first sub-electrode and the second sub-electrode on the first dielectric substrate are partially overlapped with each other.

In some implementations, the first electrode includes a first reference electrode and a second reference electrode, an orthographic projection of the second electrode on the first dielectric substrate is located between orthographic projections of the first reference electrode and the second reference electrode on the first dielectric substrate.

In some implementations, the second electrode includes the first sub-electrode and the second sub-electrode which are staggered along the first direction, and orthographic projections of the first sub-electrode and the second sub-electrode, which are adjacent to each other, on the first dielectric substrate are partially overlapped.

In some implementations, the first electrode is provided in the same layer as the first sub-electrode, or the first electrode is provided in the same layer as the second sub-electrode.

In some implementations, orthographic projections of the first electrode and the second electrode on the first dielectric substrate are arranged side by side in a second direction, each of the first electrode and the second electrode includes the first sub-electrode and the second sub-electrode which are arranged in a staggered manner along the first direction, and in the first direction, orthographic projections of the first sub-electrode and the second sub-electrode, which are adjacent to each other, on the first dielectric substrate are partially overlapped.

In some implementations, in the second direction, the first sub-electrode of the first electrode and the first sub-electrode of the second electrode are arranged corresponding to each other, the second sub-electrode of the first electrode and the second sub-electrode of the second electrode are arranged corresponding to each other;

centers of first sub-electrodes arranged side by side in the second direction are on a same straight line; and/or centers of second sub-electrodes arranged side by side in the second direction are on a same straight line.

In some implementations, the first electrode includes the first sub-electrode and the second sub-electrode staggered in the first direction, and in the first direction, orthographic projections of the first sub-electrode and the second sub-electrode, which are adjacent to each other, on the first dielectric substrate are partially overlapped.

In some implementations, the second electrode is provided in the same layer as the first sub-electrode, or the first electrode is provided in the same layer as the second sub-electrode.

In some implementations, the first reference electrode and the second reference electrode are arranged side by side in the second direction, each of the first reference electrode and the second reference electrode includes the first sub-electrode and the second sub-electrode which are arranged in a staggered manner along the first direction, in the first direction, orthographic projections of the first sub-electrode and the second sub-electrode, which are adjacent to each other, on the first dielectric substrate are partially overlapped;

the first sub-electrode of the first reference electrode and the first sub-electrode of the second reference electrode are arranged corresponding to each other, and the second sub-electrode of the first reference electrode and the second sub-electrode of the second reference electrode are arranged corresponding to each other.

In some implementations, the second electrode includes the first sub-electrode and the second sub-electrode staggered in the first direction, orthographic projections of the first sub-electrode and the second sub-electrode, which are adjacent to each other, on the first dielectric substrate are partially overlapped, and the first reference electrode and the second sub-electrode are provided in a same layer, and the second reference electrode and the second sub-electrode are provided in a same layer.

In some implementations, the first sub-electrode includes a first body structure, and a plurality of first branch structures arranged side by side in the first direction and electrically connected to the first body structure; the second sub-electrode includes a second body structure and a plurality of second branch structures which are arranged side by side in the first direction and electrically connected to the second body structure;

orthographic projections of the first branch structures on the first dielectric substrate are respectively overlapped with orthographic projections of the second branch structures on the first dielectric substrate, and orthographic projections of the first branch structures on the first dielectric substrate overlap with an orthographic projection of the second body structure on the first dielectric substrate; orthographic projections of the second branch structures on the first dielectric substrate overlap with an orthographic projection of the first body structure on the first dielectric substrate.

In some implementations, the first sub-electrode is arranged in the same layer as the first reference electrode, and the second sub-electrode is arranged in the same layer as the second reference electrode.

In a second aspect, an embodiment of the present disclosure provides an antenna, which includes any phase shifter described above.

In some implementations, the antenna further includes a first feeding structure and a second feeding structure, where the first feeding structure is electrically connected with an end of the second electrode, and the second feeding structure is electrically connected with another end of the second electrode.

In some implementations, the antenna further includes a first waveguide structure and a second waveguide structure, where an orthographic projection of the first feeding structure on the first dielectric substrate at least partially overlaps with an orthographic projection of a first port of the first waveguide structure on the first dielectric substrate, and an orthographic projection of the second feeding structure on the first dielectric substrate at least partially overlaps with an orthographic projection of a first port of the second waveguide structure on the first dielectric substrate.

In some implementations, the first waveguide structure is arranged on a side of the first dielectric substrate away from the adjustable dielectric layer, and the second waveguide structure is arranged on a side of the second dielectric substrate away from the adjustable dielectric layer;

or, the first waveguide structure and the second waveguide structure are both arranged on the side of the second dielectric substrate away from the adjustable dielectric layer, and an orthographic projection of the first waveguide structure on the second dielectric substrate is not overlapped with an orthographic projection of the second waveguide structure on the second dielectric substrate.

DETAIL DESCRIPTION OF EMBODIMENTS

In order to make the technical solutions of the present invention better understood, the present invention is further described in detail below with reference to the accompanying drawings and implementations.

Unless defined otherwise, technical or scientific terms used herein shall have the ordinary meaning as understood by one of ordinary skill in the art to which the present disclosure belongs. The terms "first," "second," and the like, as used in the description, do not denote any order, quantity, or importance, but rather are used to distinguish one element from another. Also, the use of the terms "a," "an,", "the" or the like does not denote a limitation of quantity, but rather denotes the presence of at least one. The word "comprising/including" or "comprises/includes", and the like, means that the element or item preceding the word contains the element or item listed after the word and its equivalent, but does not exclude other elements or items. The terms "connecting" or "coupling" and the like are not restricted to physical or mechanical connections, but may include electrical connections, whether direct or indirect. The words "upper/on", "lower/below", "left", "right", and the like are used only to indicate relative positional relationships, and when an absolute position of the object being described is changed, the relative positional relationships may be changed accordingly.

Figure 1:
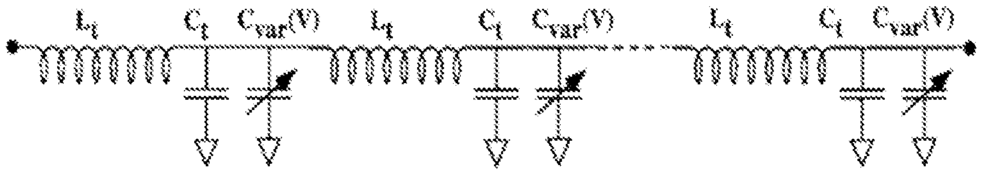
FIG. 1 is an equivalent circuit diagram of a transmission line being periodically loaded with variable capacitors in parallel.

It should be noted here that the transmission line is periodically loaded with variable capacitors in parallel, so that a phase can be changed by changing capacitance values of the variable capacitors, and an equivalent model of the transmission line being periodically loaded with variable capacitors in parallel is shown in FIG. 1. In FIG. 1, Lt and Ct are equivalent line inductor and line capacitor of the transmission line, which depend on characteristics of the transmission line and a substrate. Each variable capacitor Cvar (V) may be realized by a MEMS (micro-electromechanical system) capacitor, a variable diode capacitor, or the like. At present, a capacitance value of a plate capacitor is changed by voltage-controlled liquid crystals, so that a liquid crystal phase shifter is manufactured.

Figure 2:
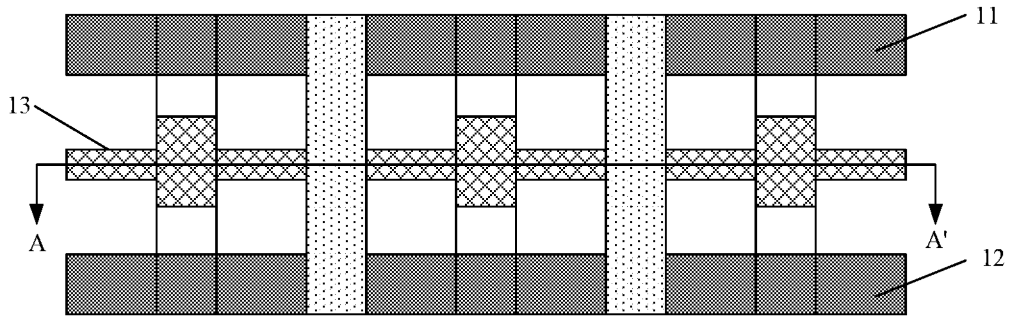
FIG. 2 is a top view of an exemplary phase shifter.
Figure 3:
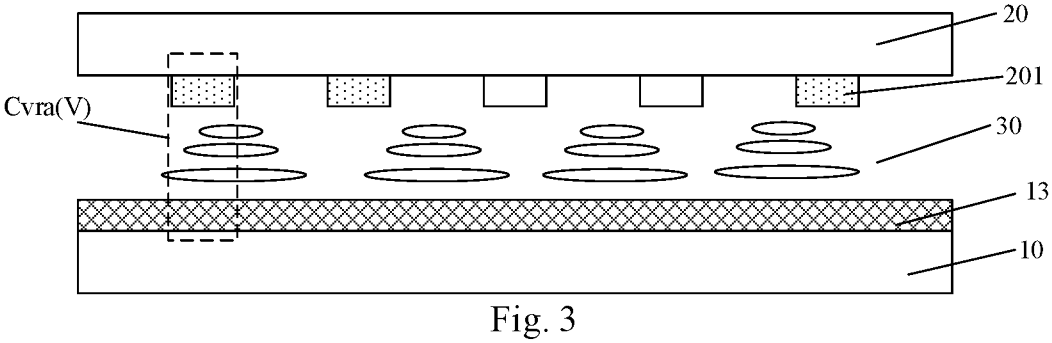
FIG. 3 is a cross-sectional view of the phase shifter of FIG. 2 taken along a line A-A'.

FIG. 2 is a top view of an exemplary phase shifter; FIG. 3 is a cross-sectional view of the phase shifter of FIG. 2 taken along a line A-A', the equivalent circuit diagram of the phase shifter is also as shown in FIG. 1. As shown in FIGS. 2 and 3, the phase shifter is a liquid crystal phase shifter serving as a CPW phase shifter, which includes a first substrate and a second substrate arranged opposite to each other, and a liquid crystal layer 30 formed between the first substrate and the second substrate.

The first substrate includes a first dielectric substrate 10, and a reference electrode and a signal electrode 13 which are arranged on a side of the first dielectric substrate 10 close to the liquid crystal layer 30, the reference electrode includes a first reference electrode 11 and a second reference electrode 12, and the signal electrode 13 is arranged between the first reference electrode 11 and the second reference electrode 12; the signal electrode 13 includes a body structure which extends in a direction the same as a direction in which the first reference electrode 11 (which is a first ground sub-electrode) and the second reference electrode 12 (which is a second ground sub-electrode) extend, and a plurality of branch structures connected to the body structure and arranged at intervals in a longitudinal direction of the body structure.

The second substrate includes a second dielectric substrate 20 and a plurality of patch electrodes 201 arranged on a side of the second dielectric substrate 20 close to the liquid crystal layer 30, extending directions in which the patch electrodes 201 extend are the same as extending directions in which the branch structures of the signal electrode 13 extend, and the patch electrodes 201 are arranged in one-to-one correspondence with the branch structures. Meanwhile, an orthographic projection of each patch electrode 201 on the first dielectric substrate 10 is at least partially overlapped with an orthographic projection of the branch structure corresponding to the patch electrode on the first dielectric substrate 10, and orthographic projections of the first reference electrode 11 and the second reference electrode 12 on the first dielectric substrate 10 are at least partially overlapped with each other, so that a current loop is formed. Since areas of overlapping regions of the variable capacitors Cvra (V) formed in such phase shifter are the same, during a same voltage is applied to the patch electrodes 201, equivalent impedances of the variable capacitors Cvra (V) formed are the same.

It is found that, in a transmission process of an electromagnetic wave, the CPW transmission line is periodically loaded with a series of patch electrodes, which causes reflection of the electromagnetic wave, and the resulted transmission loss cannot be reduced.

In view of the above problems, the following technical solutions are provided in the embodiments of the present disclosure. Before describing the embodiments of the present disclosure, a first electrode and a second electrode in the phase shifter according to the embodiments of the present disclosure will be explained. In the following description, the first electrode of the phase shifter is a reference electrode, the second electrode is a signal electrode, and the reference electrode includes, but is not limited to, a ground electrode.

In a first aspect, an embodiment of the present disclosure provides a phase shifter, which includes a first dielectric substrate and a second dielectric substrate, and an adjustable dielectric layer, a reference electrode, and a signal electrode arranged between the first dielectric substrate and the second dielectric substrate. The adjustable dielectric layer includes, but is not limited to, a liquid crystal layer, and the liquid crystal layer serving as the adjustable dielectric layer is taken as an example in the embodiment of the present disclosure for description. The reference electrode and the signal electrode both extend along a first direction, and are arranged side by side in a second direction. In the embodiment of the present disclosure, at least one of the reference electrode and the signal electrode in the phase shifter includes a first sub-electrode and a second sub-electrode, one of the first sub-electrode and the second sub-electrode is arranged on a side of the first dielectric substrate close to the liquid crystal layer, and the other of the first sub-electrode and the second sub-electrode is arranged on a side of the second dielectric substrate close to the liquid crystal layer. Orthographic projections of the first sub-electrode and the second sub-electrode on the first dielectric substrate are partially overlapped to form a plurality of variable capacitors connected in series.

In the embodiment of the present disclosure, since the reference electrode and/or the signal electrode includes the first sub-electrode arranged on the first dielectric substrate and the second sub-electrode arranged on the second dielectric substrate, and the orthographic projections of the first sub-electrode and the second sub-electrode on the first dielectric substrate are partially overlapped, so that a plurality of variable capacitors connected in series can be formed, the formation of the patch electrodes to be loaded periodically is avoided, the transmission loss of the electromagnetic wave is reduced, and it is verified that a dielectric constant of the liquid crystal layer is changed from 2.4 to 3.5, and with the phase shifter including eight variable capacitors connected in series, a phase shift of the electromagnetic wave ranging from 11.5 GHz to 12.5 GHz may exceed 70°.

In some examples, two reference electrodes are provided, i.e., the reference electrode includes a first reference electrode and a second reference electrode, in this case, an orthographic projection of the signal electrode on the first dielectric substrate is located between orthographic projections of the first reference electrode and the second reference electrode on the first dielectric substrate. Certainly, the phase shifter may include only one reference electrode on a side of the signal electrode in the first direction. Hereinafter, for convenience of description, a case where the reference electrode includes the first reference electrode and the second reference electrode is taken an example.

The phase shifter according to the embodiment of the present disclosure is described below with reference to specific examples.

Figure 4:
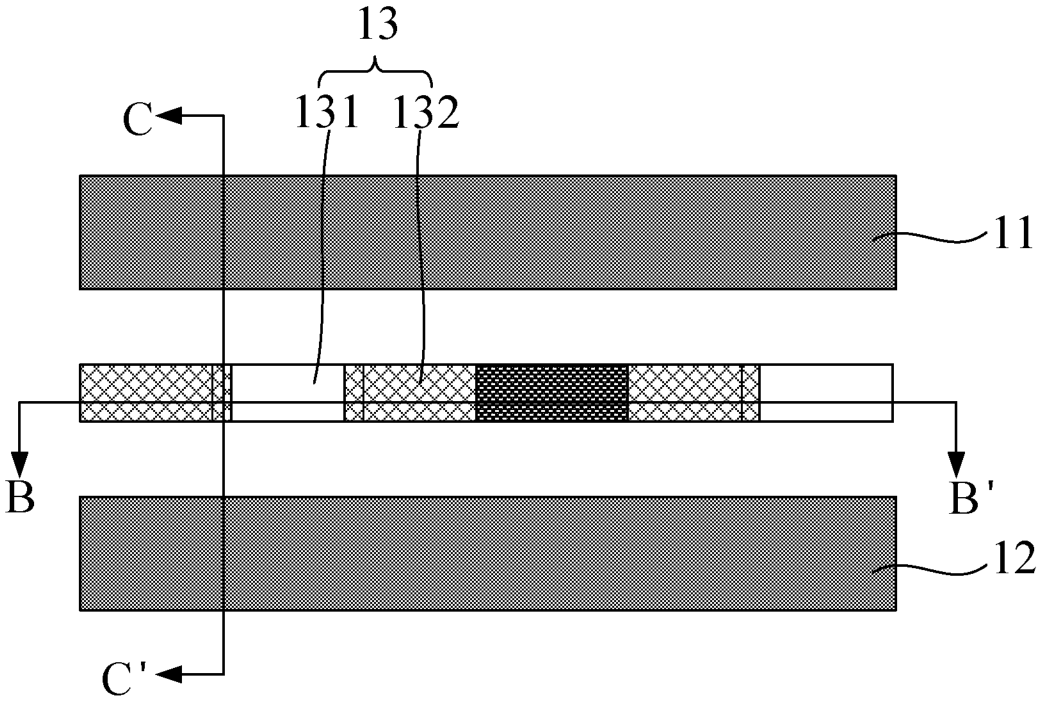
FIG. 4 is a top view of a phase shifter in a first example according to an embodiment of the present disclosure.
Figure 5:
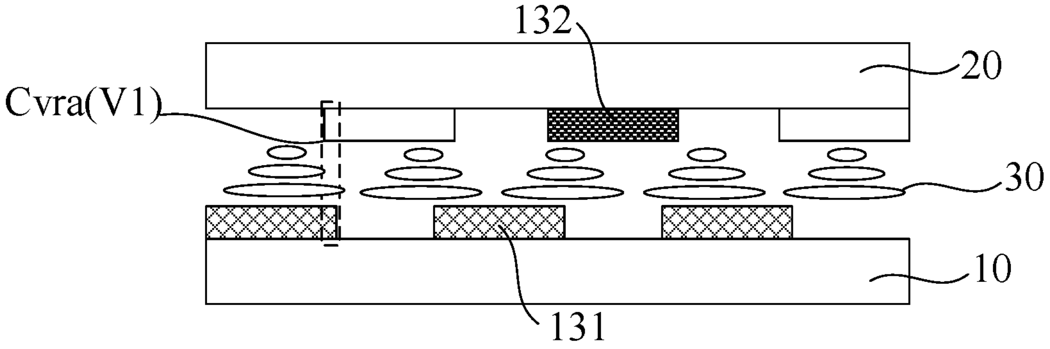
FIG. 5 is a cross-sectional view of the phase shifter of FIG. 4 taken along a line B-B'.
Figure 6:
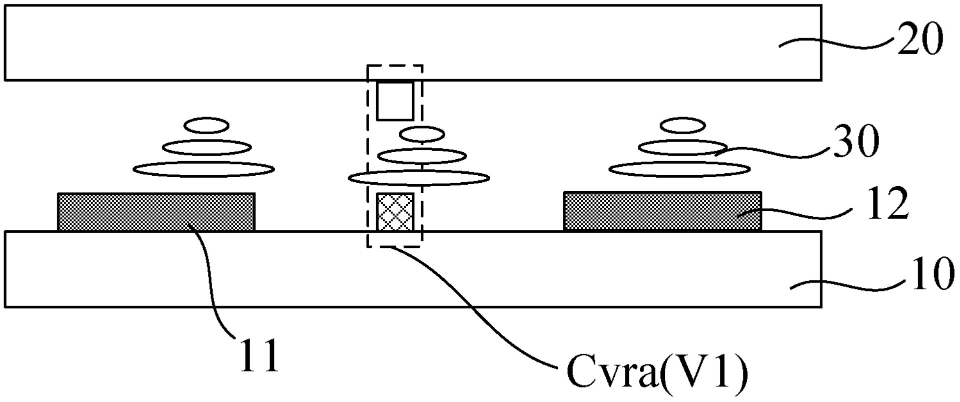
FIG. 6 is a cross-sectional view of the phase shifter of FIG. 4 taken along a line C-C'.
Figure 7:
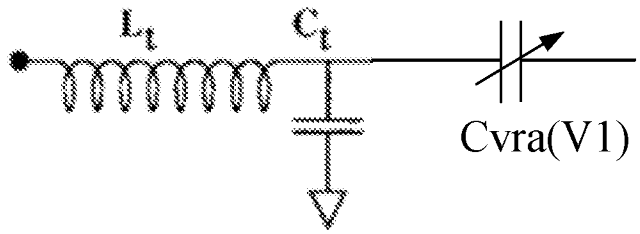
FIG. 7 is an equivalent circuit diagram of the phase shifter of FIG. 4.

FIG. 4 is a top view of a phase shifter in a first example according to an embodiment of the present disclosure, FIG. 5 is a cross-sectional view of the phase shifter of FIG. 4 taken along a line B-B', FIG. 6 is a cross-sectional view of the phase shifter of FIG. 4 taken along a line C-C', FIG. 7 is an equivalent circuit diagram of the phase shifter of FIG. 4. As shown in FIGS. 4 to 7, the signal electrode 13 in the phase shifter includes a plurality of first sub-electrodes 131 and a plurality of second sub-electrodes 132, the first sub-electrodes 131 and the second sub-electrodes 132 are arranged in a staggered manner in the first direction, and orthographic projections of the first sub-electrode 131 and the second sub-electrode 132 adjacent to each other on the first dielectric substrate 10 are at least partially overlapped so as to form a plurality of first variable capacitors Cvar (V1). The liquid crystal layer 30 is located between a layer where the first sub-electrodes 131 are located and a layer where the second sub-electrodes 132 are located. The first reference electrode 11 and the second reference electrode 12 may be arranged in the same layer as the first sub-electrodes 131, or in the same layer as the second sub-electrodes 132. FIG. 4 only shows a case where the first reference electrode 11 and the second reference electrode 12 are located in the same layer as the first sub-electrodes 131.

With continued reference to FIGS. 4 to 6, in the first direction, the first sub-electrodes 131 are equally spaced, and the second sub-electrodes 132 are equally spaced. Further, a spacing between any two adjacent first sub-electrodes 131 is equal to a spacing between any two adjacent second sub-electrodes 132. Certainly, in some examples, a shape and a size of each first sub-electrode 131 are the same as those of each second sub-electrode 132 respectively. In this case, areas of overlapping regions of the variable capacitors formed by the first sub-electrodes 131 and the second sub-electrodes 132 adjacent to the first sub-electrodes 131 are the same.

With continued reference to FIGS. 4 to 6, orthographic projections of centers of the first sub-electrodes 131 and the second sub-electrodes 132 of the signal electrode 13 on the first dielectric substrate 10 are on a same straight line. With such arrangement, high integration and miniaturization of the phase shifter can be facilitated.

Figure 8:
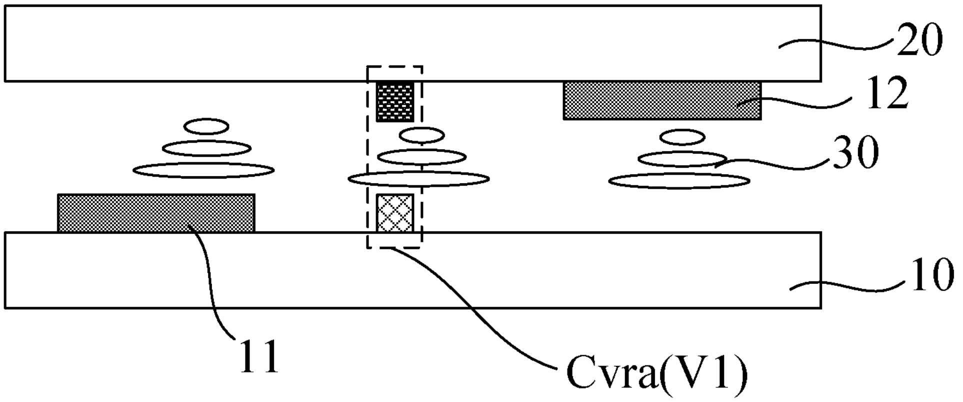
FIG. 8 is a cross-sectional view of a phase shifter in a second example according to an embodiment of the present disclosure.

FIG. 8 is a cross-sectional view of a phase shifter in a second example according to an embodiment of the present disclosure, as shown in FIG. 8, the phase shifter has substantially the same structure as the phase shifter in the first example, except that the first reference electrode 11 and the first sub-electrodes 131 of the signal electrode 13 are arranged in a same layer, the second reference electrode 12 and the second sub-electrodes 132 of the signal electrode 13 are arranged in a same layer, and the rest structure is the same as those in the first example, and thus the description thereof is not repeated herein.

Figure 9:
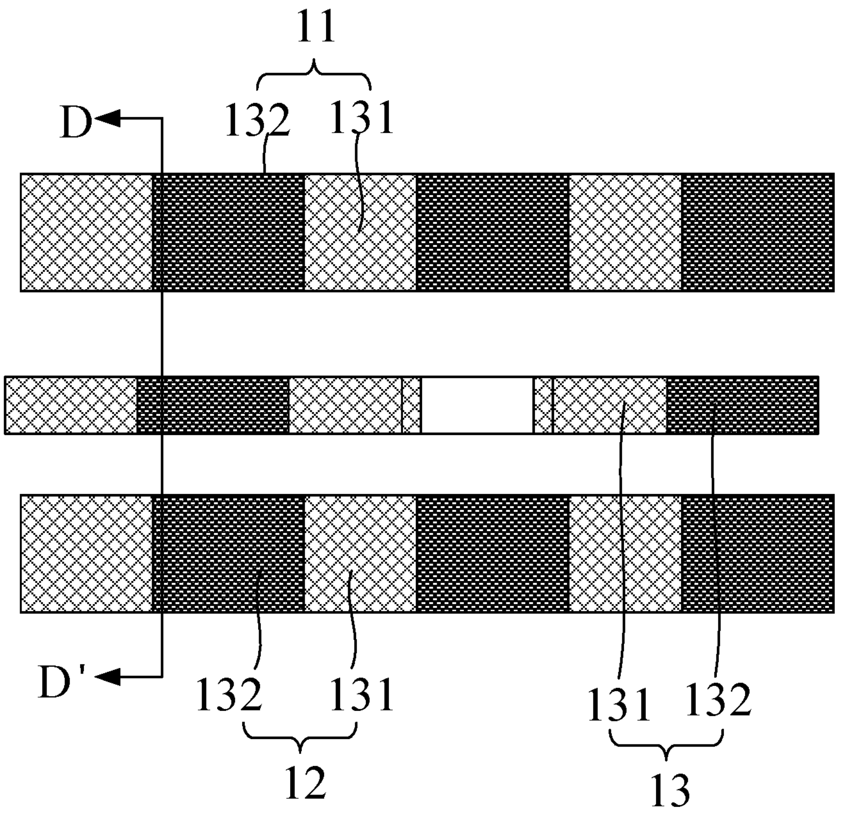
FIG. 9 is a top view of a phase shifter in a third example according to an embodiment of the present disclosure.
Figure 10:
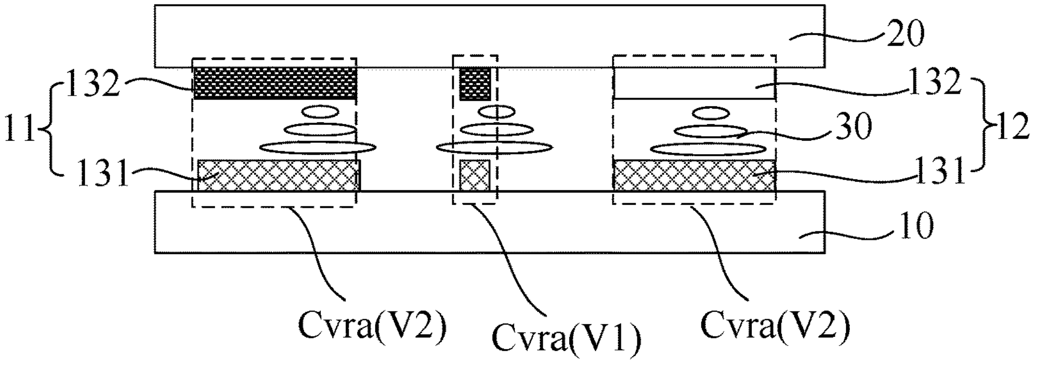
FIG. 10 is a cross-sectional view of the phase shifter of FIG. 9 taken along a line D-D'.
Figure 11:
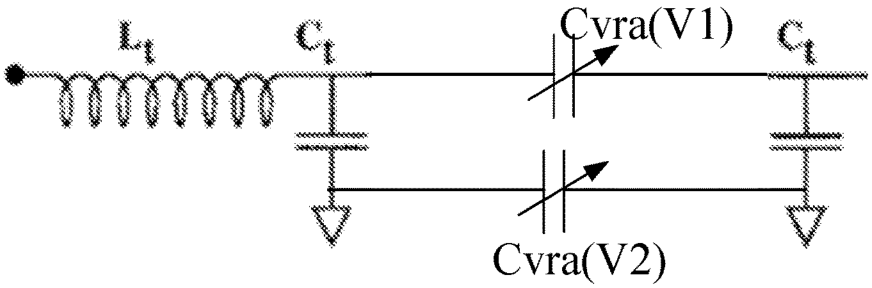
FIG. 11 is an equivalent circuit diagram of the phase shifter of FIG. 9.

FIG. 9 is a top view of a phase shifter in a third example according to an embodiment of the present disclosure, FIG. 10 is a cross-sectional view of the phase shifter of FIG. 9 taken along a line D-D', FIG. 11 is an equivalent circuit diagram of the phase shifter of FIG. 9, as shown in FIGS. 9 to 11, in this example, the first reference electrode 11, the second reference electrode 12, and the signal electrode 13 each include a plurality of first sub-electrodes 131 and a plurality of second sub-electrodes 132. The liquid crystal layer 30 is located between a layer where the first sub-electrodes 131 are located and a layer where the second sub-electrodes 132 are located. The first sub-electrodes 131 and the second sub-electrodes 132 of the first reference electrode 11 are arranged in a staggered manner in the first direction, and orthographic projections of the first sub-electrode 131 and the second sub-electrode 132, which are adjacent to each other, on the first dielectric substrate 10 are at least partially overlapped, so that a plurality of second variable capacitors Cvar (V2) are formed. The first sub-electrodes 131 and the second sub-electrodes 132 of the second reference electrode 12 are arranged in a staggered manner in the first direction, and orthographic projections of the first sub-electrode 131 and the second sub-electrode 132, which are adjacent to each other, on the first dielectric substrate 10 are at least partially overlapped, so that a plurality of second variable capacitances Cvar (V2) are formed. The first sub-electrodes 131 and the second sub-electrodes 132 of the signal electrode 13 are arranged in a staggered manner in the first direction, and orthographic projections of the first sub-electrode 131 and the second sub-electrode 132, which are adjacent to each other, on the first dielectric substrate 10 are at least partially overlapped, so that a plurality of first variable capacitors Cvar (V1) are formed.

With continued reference to FIGS. 9 and 10, in each of the first reference electrode 11, the second reference electrode 12 and the signal electrode 13, the first sub-electrodes 131 are equally spaced from each other in the first direction, and the second sub-electrodes 132 are equally spaced from each other in the first direction. Further, a spacing between any two adjacent first sub-electrodes 131 is equal to a spacing between any to adjacent second sub-electrodes 132. Certainly, in some examples, the first sub-electrodes 131 and the second sub-electrodes 132 of the first reference electrode 11 and the second reference electrode 12 are also the same in shape and size; the first sub-electrodes 131 and the second sub-electrodes 132 of the signal electrode 13 are also the same in shape and size. In this case, areas of overlapping regions of the second variable capacitors Cvar (V2) formed by the first sub-electrodes 131 and the second sub-electrodes 132, which are adjacent to each other respectively, of the first reference electrode 11 and the second reference electrode 12 are the same. Areas of overlapping regions of the first variable capacitors Cvar (V1) formed by the first sub-electrodes 131 and the second sub-electrodes 132, which are adjacent to each other respectively, of the signal electrode 13 are the same.

With continued reference to FIGS. 9 and 10, orthographic projections of centers of the first sub-electrodes 131 and the second sub-electrodes 132 of the first reference electrode 11 on the first dielectric substrate 10 are on a same straight line. Orthographic projections of centers of the first sub-electrodes 131 and the second sub-electrodes 132 of the second reference electrode 12 on the first dielectric substrate 10 are on a same straight line. Orthographic projections of centers of the first sub-electrodes 131 and the second sub-electrodes 132 of the signal electrode 13 on the first dielectric substrate 10 are on a same straight line.

With continued reference to FIGS. 9 and 10, the first sub-electrodes 131 of the first reference electrode 11, the second reference electrode 12 and the signal electrode 13 are arranged in one-to-one correspondence, and the second sub-electrodes 132 of the first reference electrode 11, the second reference electrode 12 and the signal electrode 13 are arranged in one-to-one correspondence. For example, the centers of the first sub-electrodes 131 arranged side by side in the second direction are on a same straight line, and/or, the centers of the second sub-electrodes 132 arranged side by side in the second direction are on a same straight line. With such arrangement, the first sub-electrodes 131 of the first reference electrode 11, the second reference electrode 12 and the signal electrode 13 may be formed by a single patterning process; the second sub-electrodes 132 of the first reference electrode 11, the second reference electrode 12 and the signal electrode 13 may be formed by a single patterning process, thereby reducing the process cost.

Figure 12:
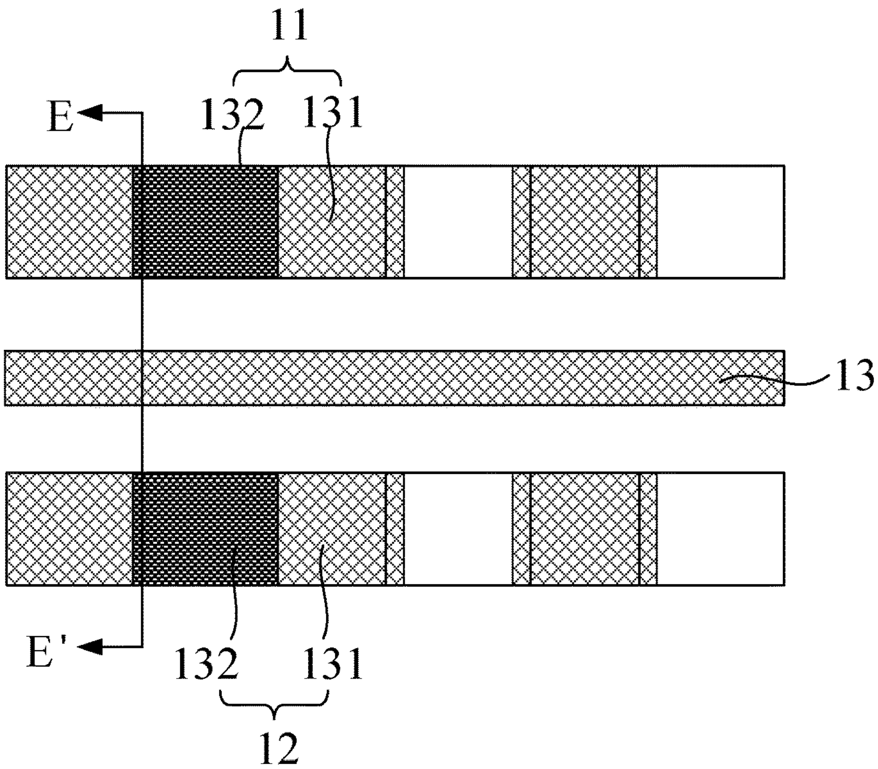
FIG. 12 is a top view of a phase shifter in a fourth example according to an embodiment of the present disclosure.
Figure 13:
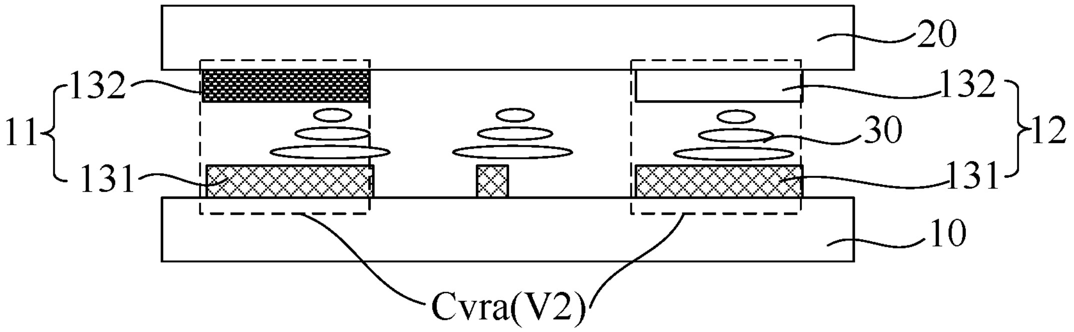
FIG. 13 is a cross-sectional view of the phase shifter of FIG. 12 taken along a line E-E'.
Figure 14:
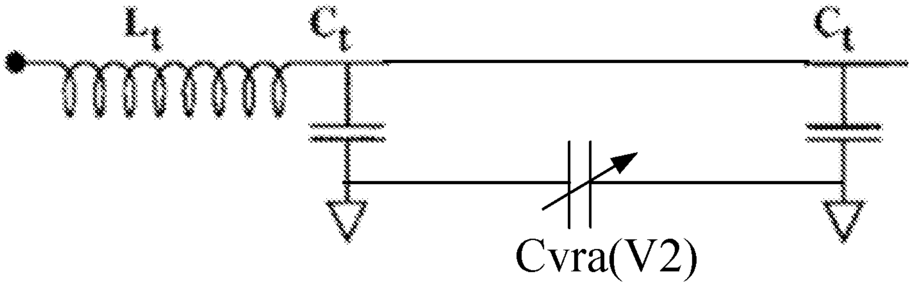
FIG. 14 is an equivalent circuit diagram of the phase shifter of FIG. 12.

FIG. 12 is a top view of a phase shifter in a fourth example according to an embodiment of the present disclosure, FIG. 13 is a cross-sectional view of the phase shifter of FIG. 12 taken along a line E-E', FIG. 14 is an equivalent circuit diagram of the phase shifter of FIG. 12. As shown in FIGS. 12 to 14, the phase shifter has substantially the same structure as the phase shifter in the third example, except that, in the phase shifter of the fourth example, only the first reference electrode 11 and the second reference electrode 12 each include the first sub-electrodes 131 and the second sub-electrodes 132, and the signal electrode 13 has a stripe structure formed into one piece. The signal electrode 13 may be arranged in the same layer as the first sub-electrodes 131, or in the same layer as the second sub-electrode 132, and FIG. 12 illustrates a case where the signal electrode 13 is arranged in the same layer as the first sub-electrodes 131.

Figure 15:
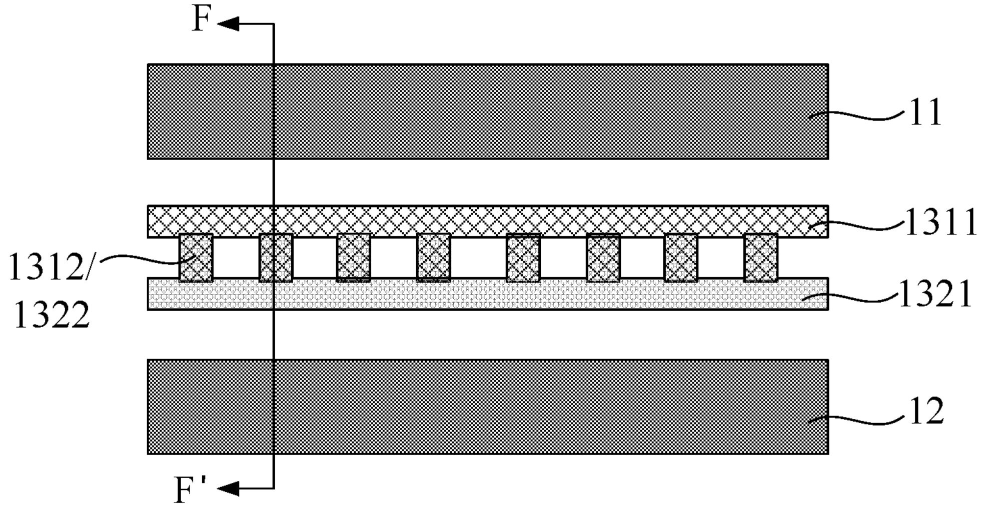
FIG. 15 is a top view of a phase shifter in a fifth example according to an embodiment of the present disclosure.
Figure 16:
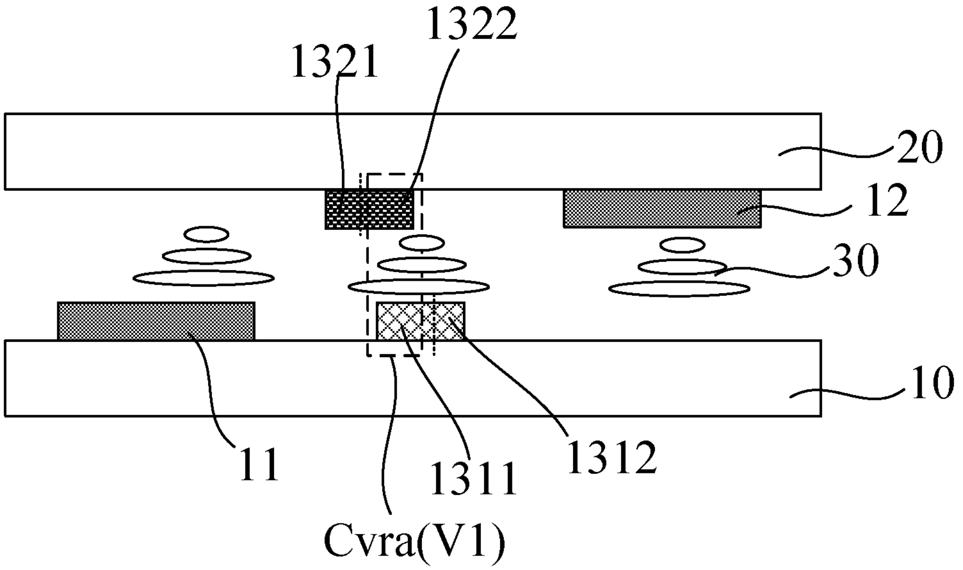
FIG. 16 is a cross-sectional view of the phase shifter of FIG. 15 taken along a line F-F'.
Figure 17:
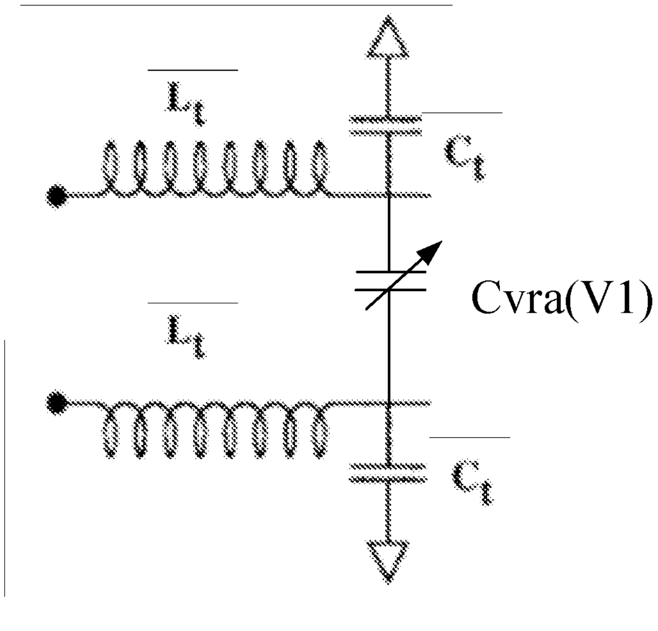
FIG. 17 is an equivalent circuit diagram of the phase shifter of FIG. 15.

FIG. 15 is a top view of a phase shifter in a fifth example according to an embodiment of the present disclosure, FIG. 16 is a cross-sectional view of the phase shifter of FIG. 15 taken along a line F-F', and FIG. 17 is an equivalent circuit diagram of the phase shifter of FIG. 15. As shown in FIGS. 15 to 17, the phase shifter includes only one first sub-electrode 131 and only one second sub-electrode 132, the first sub-electrode 131 including a first body structure 1311 and a plurality of first branch structures 1312 arranged side by side in the first direction and electrically connected to the first body structure 1311, the second sub-electrode 132 including a second body structure 1321 and a plurality of second branch structures 1322 arranged side by side in the first direction and electrically connected to the second body structure 1321, where the first body structure 1311 and the second body structure 1321 each extend in the first direction. Orthogonal projection of the first branch structures 1312 and the second branch structures 1322 on the first dielectric substrate 10 overlaps with each other in one-to-one correspondence, and the orthogonal projections of the first branch structures 1312 on the first dielectric substrate 10 overlap with an orthogonal projection of the second body structure on the first dielectric substrate 10, and the orthographic projections of the second branch structures 1322 on the first dielectric substrate 10 overlaps with an orthographic projection of the first body structure on the first dielectric substrate 10, in this case, a plurality of first variable capacitors Cvar (V1) connected in series are formed. In some examples, the first branch structures 1312 and the second branch structures 1322 may be arranged in one-to-one correspondence.

With continued reference to FIGS. 15 and 16, the first reference electrode 11 is arranged in the same layer as the first sub-electrode 131, and the second reference electrode 12 is arranged in the same layer as the second sub-electrode 132. Certainly, positions of the first reference electrode 11 and the second reference electrode 12 may be interchanged, that is, the first reference electrode 11 may be arranged in the same layer as the second sub-electrode 132, and the second reference electrode 12 may be arranged in the same layer as the first sub-electrode 131. Alternatively, the first reference electrode 11 and the second reference electrode 12 are both arranged in the same layer as one of the first sub-electrode 131 and the second sub-electrode 132.

With continued reference to FIGS. 15 and 16, the first branch structures 1312 are equally spaced apart and the second branch structures 1322 are equally spaced apart. Further, a spacing between any two adjacent first branch structures 1312 may be equal to a spacing between any two adjacent second branch structures 1322. Areas of overlapping regions of the variable capacitors formed by the first branch structures 1312 and the second branch structures 1322 are equal to each other.

It should be noted that, all the above are described by taking the example that the reference electrode includes the first reference electrode 11 and the second reference electrode 12, but in an actual product, only one reference electrode may be provided, that is, the phase shifter may include only one of the first reference electrode 11 or the second reference electrode 12, and the detailed description of the phase shifter including only one reference electrode is not repeated here.

In some examples, no matter which one of the above structures the phase shifter in the embodiment of the present disclosure adopts, the first dielectric substrate 10 and the second dielectric substrate 20 may be glass-based. Certainly, the first dielectric substrate 10 and the second dielectric substrate 20 each may employ a sapphire substrate, or may employ a polyethylene terephthalate substrate, a triallyl cyanurate substrate, or a polyimide transparent flexible substrate each having a thickness ranging from 10 μm to 500 μm, or may employ a Printed Circuit Board (PCB). Specifically, the first dielectric substrate 10 and the second dielectric substrate 20 may be made of high-purity quartz glass having extremely low dielectric loss. Compared with a common glass substrate, the first dielectric substrate 10 and the second dielectric substrate 20 being made of quartz glass can effectively reduce the loss of the microwave signal, and thus the phase shifter can have a relatively low power consumption and a relatively high signal-to-noise ratio.

In some examples, for the phase shifter in any of the above examples, the signal electrode 13 and the reference electrode may be made of a metal material, such as aluminum, silver, gold, chromium, molybdenum, nickel, or iron.

In a second aspect, an embodiment of the present disclosure further provides an antenna and an electronic device including the antenna. The antenna may include any phase shifter described above. Certainly, the antenna may further include a radiation unit, a feeding structure, and the like.

Figure 18:
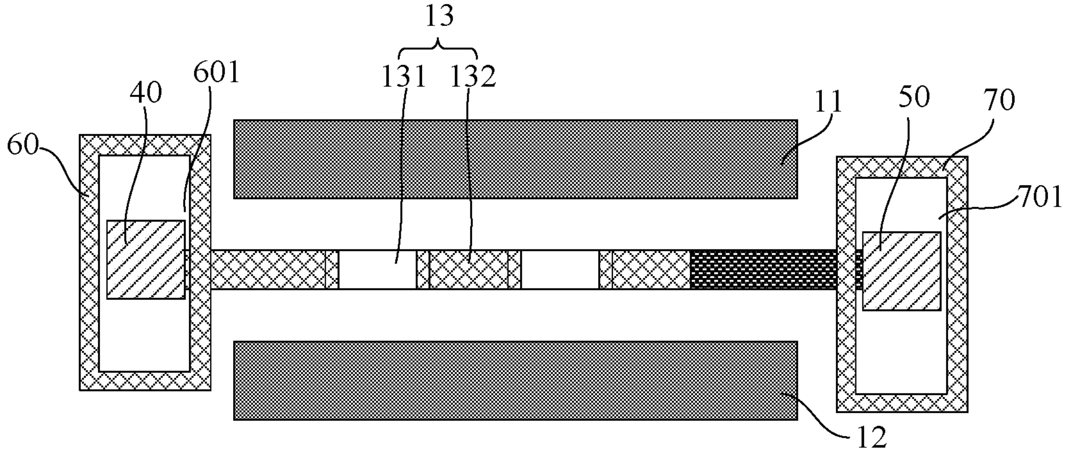
FIG. 18 is a schematic structural diagram of an antenna in an embodiment of the present disclosure.
Figure 19:
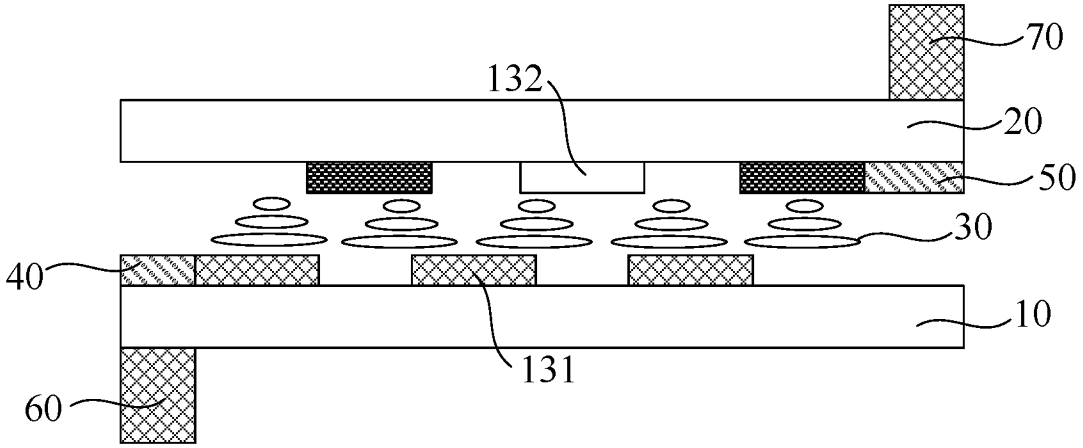
FIG. 19 is a cross-sectional view of the antenna of FIG. 18.

FIG. 18 is a schematic structural diagram of an antenna according to an embodiment of the present disclosure, FIG. 19 is a cross-sectional view of the antenna of FIG. 18, as shown in FIGS. 18 and 19, the antenna includes not only any phase shifter described above, but also a first feeding structure 40 and a second feeding structure 50. Specifically, it is exemplified that the phase shifter includes the signal electrode 13, the first reference electrode 11, and the second reference electrode 12 described above. The signal electrode 13 includes two ends opposite to each other (the two ends of the signal electrode 13 refer to two ends that are opposite to each other in the first direction), and a microwave signal is fed in from one end of the signal electrode 13 and is fed out from the other end of the signal electrode 13. The first feeding structure 40 and the second feeding structure 50 are electrically connected to the two ends of the signal electrode 13, respectively. The first feeding structure 40 is configured to change a transmission direction of the microwave signal transmitted by the signal electrode 13, so that the microwave signal transmitted by the signal electrode 13 is transmitted along a third direction, where the third direction intersects with a plane where the first dielectric substrate is located. The second feeding structure 50 is configured to change a transmission direction of the microwave signal transmitted by the signal electrode 13, so that the microwave signal transmitted by the signal electrode 13 is transmitted along a fourth direction, where the fourth direction intersects with the plane where the first dielectric substrate is located. Further, in the phase shifter, the first feeding structure 40 and the second feeding structure 50 are both feeding structures having a longitudinal electric field in a direction approximately perpendicular to the first dielectric substrate, that is, a direction of the electric field generated by the first feeding structure 40 at least partially intersects with the plane where the first dielectric substrate is located, and a direction of the electric field generated by the second feeding structure 50 at least partially intersects with the plane where the first dielectric substrate is located, therefore, the first feeding structure 40 and the second feeding structure 50 are respectively connected to two ends of the signal electrode 13, so that transverse electric fields at the two ends of the signal electrode 13 can be converted into longitudinal electric fields, and thus the microwave signal is transmitted along the longitudinal electric fields. For example, in a case where the microwave signal is fed in by the first feeding structure 40 and fed out by the second feeding structure 50, the microwave signal is coupled to the first feeding structure 40, the first feeding structure 40 transmits the received microwave signal to the signal electrode 13, the microwave signal propagates along an extending direction in which the signal electrode 13 extends, and is transmitted to the second feeding structure 50 at the other end of the signal electrode 13 after the signal being phase-shifted, the second feeding structure 50 couples the microwave signal to a side of the second dielectric substrate away from the liquid crystal layer 30 through the longitudinal electric field, and if the second dielectric substrate is provided with the radiation unit, the second feeding structure 50 may couple the microwave signal to the radiation unit, and then the microwave signal is radiated out by the radiation unit. Since the first feeding structure 40 and the second feeding structure 50 are connected to two ends of the signal electrode 13, the first feeding structure 40 and the second feeding structure 50 can convert the transverse electric fields at two ends of the signal electrode 13 into the longitudinal electric fields, thereby realizing conversion of the transverse electric fields at two ends of the coplanar waveguide transmission line into the longitudinal electric fields.

It should be noted that, the third direction and the fourth direction are both directions intersecting the plane where the first dielectric substrate is located, that is, the transmission direction (third direction) of the microwave signal changed by the first feeding structure 40 intersects the plane where the first dielectric substrate is located, and similarly, the transmission direction (fourth direction) of the microwave signal changed by the electric field direction of the second feeding structure 50 intersects the plane where the first dielectric substrate is located, and the first direction and the second direction may be any direction satisfying the above characteristics. For convenience of description, the following is described by taking a case where the third direction is a direction perpendicular to the plane where the first dielectric substrate is located, and the fourth direction is a direction perpendicular to the plane where the first dielectric substrate is located, and the third direction and the fourth direction are the same as an example, but the present disclosure is not limited thereto.

It should be noted that, in a case where the phase shifter is applied to an antenna, the antenna may serve as a transmitting antenna or a receiving antenna, the radiation unit is connected to the second feeding structure 50, if the antenna serves as the transmitting antenna, the first feeding structure 40 may receive a signal fed in by a feed-forward circuit, and then input the signal to the signal electrode 13, and after receiving the signal, the second feeding structure 50 couples the signal to the radiation unit, and the radiation unit transmits the signal out. In a case where the antenna serves as the receiving antenna, the radiation unit receives a signal and then couples it to the second feeding structure 50, after receiving the signal, the second feeding structure 50 transmits the signal to the signal electrode 13, and the first feeding structure 40 connected to the other end of the signal electrode 13 receives the signal and then couples it back to the feed-forward circuit. For convenience of description, the following is described by taking the first feeding structure 40 of the phase shifter serving as an input terminal and the second feeding structure 50 of the phase shifter serving as an output terminal as an example.

In some examples, each of the first feeding structure 40 and the second feeding structure 50 may be any feeding structure capable of transmitting a microwave signal in a direction not parallel to the first dielectric substrate, for example, the first feeding structure 40 may be a monopole electrode, and the first feeding structure 40 may be arranged in the same layer and made of the same material as the signal electrode 13. The second feeding structure 50 may also be a monopole electrode, and the second feeding structure 50 may be arranged in the same layer and made of the same material as the signal electrode 13. Therefore, monopole electrodes are connected to two ends of the signal electrode 13, the monopole electrodes can convert the transverse electric fields of the signal electrode 13 of the CPW transmission line into the longitudinal electric fields, and radiate microwave signals in a direction perpendicular to the first dielectric substrate, so that feeding-in and feeding-out of the microwave signals are achieved. Specific structures of the monopole electrodes serving as the first feeding structure 40 and the second feeding structure 50 may be of various types, for example, each of the first feeding structure 40 and the second feeding structure 50 may be a monopole patch electrode arranged in the same layer as the signal electrode 13, and in some examples, the first feeding structure 40, the second feeding structure 50 and the signal electrode 13 may be formed into one piece (of a unitary structure), so that the process can be simplified. In the following, taking a case where the first feeding structure 40 and the second feeding structure 50 are both monopole patch electrodes as an example.

With continued reference to FIGS. 18 and 19, the phase shifter provided by the embodiment of the present disclosure may provide waveguide structures at both the first feeding structure 40 and the second feeding structure 50, that is, the phase shifter may further include a first waveguide structure 60 and a second waveguide structure 70. The first feeding structure 40 and the second feeding structure 50 are respectively connected to two ends of the signal electrode 13, the first waveguide structure 60 is provided with a first port 601 and a second port, and the first waveguide structure 60 is arranged corresponding to the first feeding structure 40, that is, an orthographic projection of the first feeding structure 40 on the first dielectric substrate at least partially overlaps with an orthographic projection of the first port 601 of the first waveguide structure 60 on the first dielectric substrate, and the second waveguide structure 70 is provided with a first port 701 and a second port, and the second waveguide structure 70 is arranged corresponding to the second feeding structure 50, that is, an orthographic projection of the second feeding structure 50 on the first dielectric substrate at least partially overlaps with an orthographic projection of the first port 701 of the second waveguide structure 70 on the first dielectric substrate.

In the phase shifter, the first feeding structure 40 and the second feeding structure 50 are both feeding structures each having a longitudinal electric field in a direction approximately perpendicular to the first dielectric substrate, therefore, the first feeding structure 40 and the second feeding structure 50 are respectively connected to two ends of the signal electrode 13, and can convert the transverse electric fields at two ends of the signal electrode 13 into longitudinal electric fields, taking a case where a microwave signal is fed in by the first feeding structure 40 and fed out by the second feeding structure 50 as an example, the microwave signal is fed into a waveguide cavity of the first waveguide structure 60 from the second port of the first waveguide structure 60, and then coupled to the first feeding structure 40 from the first port 601 of the first waveguide structure 60 overlapped with the first feeding structure 40, the first feeding structure 40 transmits the received microwave signal to the signal electrode 13, the microwave signal propagates along an extending direction in which the signal electrode 13 extends, and is transmitted to the second feeding structure 50 at the other end of the signal electrode 13 after the signal being phase-shifted, the second feeding structure 50 couples the microwave signal to the first port 701 of the second waveguide structure 70 overlapped with the second feeding structure 50 through the longitudinal electric field, and then the microwave signal is fed out by the second port of the second waveguide structure 70. Since the first feeding structure 40 and the second feeding structure 50 are connected to two ends of the signal electrode 13, the first feeding structure 40 and the second feeding structure 50 can convert the transverse electric fields at two ends of the signal electrode 13 into the longitudinal electric fields, thereby realizing the conversion from the transverse electric fields at two ends of the coplanar waveguide transmission line to the longitudinal electric fields, furthermore, since the first waveguide structure 60 and the second waveguide structure 70 are adopted to transmit the microwave signal, the transmission loss of the microwave signal can be effectively reduced.

It should be noted that, in the phase shifter provided in the embodiment of the present disclosure, the phase shifter may be provided with only the first waveguide structure 60, or only the second waveguide structure 70, or both the first waveguide structure 60 and the second waveguide structure 70, which is not limited herein. The following is described by taking a case where both the first waveguide structure 60 and the second waveguide structure 70 are provided in the phase shifter as an example.

In some examples, the first waveguide structure 60 is arranged on a side of the first dielectric substrate away from the adjustable dielectric layer, and the second waveguide structure 70 is arranged on a side of the second dielectric substrate away from the adjustable dielectric layer; alternatively, the first waveguide structure 60 and the second waveguide structure 70 are both arranged on a side of the second dielectric substrate away from the adjustable dielectric layer, and an orthographic projection of the first waveguide structure on the second dielectric substrate does not overlap with an orthographic projection of the second waveguide structure on the second dielectric substrate.

The electronic device in the embodiment of the present disclosure includes: a transceiving unit, a radio frequency transceiver, a signal amplifier, a power amplifier and a filtering unit. The antenna in the electronic device may serve as a transmitting antenna or a receiving antenna. The transceiver unit may include a baseband and a receiving terminal, where the baseband provides signals of at least one frequency band, for example, provides 2G signals, 3G signals, 4G signals, 5G signals, and transmits the signals of at least one frequency band to the radio frequency transceiver. After receiving a signal, the antenna in the electronic device may transmit the signal to the receiving terminal in the transceiving unit after the signal being processed by the filtering unit, the power amplifier, the signal amplifier, and the radio frequency transceiver, where the receiving terminal may be, for example, an intelligent gateway.

Furthermore, the radio frequency transceiver is connected to the transceiver unit, and is configured to modulate a signal transmitted by the transceiver unit, or demodulate a signal received by the antenna and transmit the modulated signal to the transceiver unit. Specifically, the radio frequency transceiver may include a transmitting circuit, a receiving circuit, a modulating circuit, and a demodulating circuit, and after the transmitting circuit receives multiple types of signals provided by the baseband, the modulating circuit may modulate the multiple types of signals provided by the baseband, and then transmit the modulated signals to the antenna. The antenna receives the signals and transmits the signals to the receiving circuit of the radio frequency transceiver, the receiving circuit transmits the signals to the demodulating circuit, and the demodulating circuit demodulates the signals and transmits the demodulated signals to the receiving terminal.

Furthermore, the radio frequency transceiver is connected to the signal amplifier and the power amplifier, the signal amplifier and the power amplifier are further connected to the filtering unit, and the filtering unit is connected with at least one antenna. In the process of transmitting signals by the electronic device, the signal amplifier is configured to improve the signal-to-noise ratio of the signal output by the radio frequency transceiver and then transmit the signal to the filtering unit; the power amplifier is configured to amplify power of the signal output by the radio frequency transceiver and then transmit the signal to the filtering unit; the filtering unit may include a duplexer and a filtering circuit, and combines signals output by the signal amplifier and the power amplifier, filters clutter out and then transmits the combined signal to the antenna, and the antenna radiates the signal out. In the process of receiving a signal by electronic device, after receiving the signal, the antenna transmits the signal to the filtering unit, the filtering unit filters the signal received by the antenna to remove the clutter and then transmits the signal to the signal amplifier and the power amplifier, and the signal amplifier gains the signal received by the antenna to increase the signal-to-noise ratio of the signal; the power amplifier amplifies the power of the signal received by the antenna. The signal received by the antenna is processed by the power amplifier and the signal amplifier and then transmitted to the radio frequency transceiver, and then the radio frequency transceiver transmits the signal to the transceiver unit.

In some examples, the signal amplifier may include various types of signal amplifiers, such as a low noise amplifier, which is not limited herein.

In some examples, the electronic device provided in the present disclosure further includes a power management unit, which is connected to the power amplifier, for providing the power amplifier with a voltage for amplifying the signal.

It will be understood that the above implementations are merely exemplary implementations employed to illustrate the principles of the present disclosure, and the present disclosure is not limited thereto. It will be apparent to those skilled in the art that various changes and modifications may be made without departing from the spirit and scope of the present disclosure, and these changes and modifications are to be considered within the scope of the present disclosure.

What is claimed is:

1. A phase shifter, comprising: a first dielectric substrate and a second dielectric substrate arranged opposite to each other, and an adjustable dielectric layer, a first electrode and a second electrode which are arranged between the first dielectric substrate and the second dielectric substrate, wherein the first electrode and the second electrode each extend in a first direction, and at least one of the first electrode and the second electrode comprises a first sub-electrode and a second sub-electrode;

the first sub-electrode is arranged on a side of the first dielectric substrate close to the adjustable dielectric layer, and the second sub-electrode is arranged on a side of the second dielectric substrate close to the adjustable dielectric layer, orthographic projections of the first sub-electrode and the second sub-electrode on the first dielectric substrate are partially overlapped with each other, wherein the first electrode comprises a first reference electrode and a second reference electrode, an orthographic projection of the second electrode on the first dielectric substrate is located between orthographic projections of the first reference electrode and the second reference electrode on the first dielectric substrate.

2. The phase shifter of claim 1, wherein the second electrode comprises the first sub-electrode and the second sub-electrode which are staggered in the first direction, and orthographic projections of the first sub-electrode and the second sub-electrode, which are adjacent to each other, on the first dielectric substrate are partially overlapped.

3. The phase shifter of claim 2, wherein the first electrode is provided in the same layer as the first sub-electrode, or the first electrode is provided in the same layer as the second sub-electrode.

4. The phase shifter of claim 1, wherein orthographic projections of the first electrode and the second electrode on the first dielectric substrate are arranged side by side in a second direction, each of the first electrode and the second electrode comprises the first sub-electrode and the second sub-electrode which are arranged in a staggered manner along the first direction, and in the first direction, orthographic projections of the first sub-electrode and the second sub-electrode, which are adjacent to each other, on the first dielectric substrate are partially overlapped.

5. The phase shifter of claim 4, wherein, in the second direction, the first sub-electrode of the first electrode is arranged corresponding to the first sub-electrode of the second electrode, the second sub-electrode of the first electrode is arranged corresponding to the second sub-electrode of the second electrode;

centers of first sub-electrodes arranged side by side in the second direction are on a same straight line; and/or centers of second sub-electrodes arranged side by side in the second direction are on a same straight line.

6. The phase shifter of claim 1, wherein the first electrode includes the first sub-electrode and the second sub-electrode staggered in the first direction, and in the first direction, orthographic projections of the first sub-electrode and the second sub-electrode, which are adjacent to each other, on the first dielectric substrate are partially overlapped.

7. The phase shifter of claim 6, wherein the second electrode is provided in the same layer as the first sub-electrode, or the first electrode is provided in the same layer as the second sub-electrode.

8. The phase shifter of claim 1, wherein the first reference electrode and the second reference electrode are arranged side by side in a second direction, each of the first reference electrode and the second reference electrode comprises the first sub-electrode and the second sub-electrode which are arranged in a staggered manner along the first direction, in the first direction, orthographic projections of the first sub-electrode and the second sub-electrode, which are adjacent to each other, on the first dielectric substrate are partially overlapped;

the first sub-electrode of the first reference electrode is arranged corresponding to the first sub-electrode of the second reference electrode, and the second sub-electrode of the first reference electrode is arranged corresponding to the second sub-electrodes of the second reference electrode.

9. The phase shifter of claim 1, wherein the second electrode comprises the first sub-electrode and the second sub-electrode staggered in the first direction, orthographic projections of the first sub-electrode and the second sub-electrode, which are adjacent to each other, on the first dielectric substrate are partially overlapped, and the first reference electrode and the second sub-electrode are provided in a same layer, and the second reference electrode and the second sub-electrode are provided in a same layer.

10. The phase shifter of claim 1, wherein the first sub-electrode comprises a first body structure, and a plurality of first branch structures arranged side by side in the first direction and electrically connected to the first body structure; the second sub-electrode comprises a second body structure and a plurality of second branch structures which are arranged side by side in the first direction and electrically connected to the second body structure;

orthographic projections of the first branch structures and the second branch structures on the first dielectric substrate are overlapped in one-to-one correspondence, and orthographic projections of the first branch structures on the first dielectric substrate overlap with an orthographic projection of the second body structure on the first dielectric substrate; orthographic projections of the second branch structures on the first dielectric substrate overlap with an orthographic projection of the first body structure on the first dielectric substrate.

11. The phase shifter of claim 10, wherein the first sub-electrode is arranged in the same layer as the first reference electrode, and the second sub-electrode is arranged in the same layer as the second reference electrode.

12. An antenna, comprising a phase shifter, wherein, the phase shifter comprises:

a first dielectric substrate and a second dielectric substrate arranged opposite to each other, and an adjustable dielectric layer, a first electrode and a second electrode which are arranged between the first dielectric substrate and the second dielectric substrate, wherein the first electrode and the second electrode each extend in a first direction, and at least one of the first electrode and the second electrode comprises a first sub-electrode and a second sub-electrode;

the first sub-electrode is arranged on a side of the first dielectric substrate close to the adjustable dielectric layer, and the second sub-electrode is arranged on a side of the second dielectric substrate close to the adjustable dielectric layer, orthographic projections of the first sub-electrode and the second sub-electrode on the first dielectric substrate are partially overlapped with each other, and wherein the first electrode comprises a first reference electrode and a second reference electrode, an orthographic projection of the second electrode on the first dielectric substrate is located between orthographic projections of the first reference electrode and the second reference electrode on the first dielectric substrate.

13. The antenna of claim 12, further comprising: a first feeding structure and a second feeding structure, wherein the first feeding structure is electrically connected with an end of the second electrode, and the second feeding structure is electrically connected with another end of the second electrode.

14. The antenna of claim 13, further comprising: a first waveguide structure and a second waveguide structure, wherein an orthographic projection of the first feeding structure on the first dielectric substrate at least partially overlaps with an orthographic projection of a first port of the first waveguide structure on the first dielectric substrate, and an orthographic projection of the second feeding structure on the first dielectric substrate at least partially overlaps with an orthographic projection of a first port of the second waveguide structure on the first dielectric substrate.

15. The antenna of claim 14, wherein the first waveguide structure is arranged on a side of the first dielectric substrate away from the adjustable dielectric layer, and the second waveguide structure is arranged on a side of the second dielectric substrate away from the adjustable dielectric layer;

or, the first waveguide structure and the second waveguide structure are both arranged on the side of the second dielectric substrate away from the adjustable dielectric layer, and an orthographic projection of the first waveguide structure on the second dielectric substrate is not overlapped with an orthographic projection of the second waveguide structure on the second dielectric substrate.

16. An electronic device, comprising an antenna comprising a phase shifter, wherein, the phase shifter comprises:

a first dielectric substrate and a second dielectric substrate arranged opposite to each other, and an adjustable dielectric layer, a first electrode and a second electrode which are arranged between the first dielectric substrate and the second dielectric substrate, wherein the first electrode and the second electrode each extend in a first direction, and at least one of the first electrode and the second electrode comprises a first sub-electrode and a second sub-electrode;

the first sub-electrode is arranged on a side of the first dielectric substrate close to the adjustable dielectric layer, and the second sub-electrode is arranged on a side of the second dielectric substrate close to the adjustable dielectric layer, orthographic projections of the first sub-electrode and the second sub-electrode on the first dielectric substrate are partially overlapped with each other, and wherein the first electrode comprises a first reference electrode and a second reference electrode, an orthographic projection of the second electrode on the first dielectric substrate is located between orthographic projections of the first reference electrode and the second reference electrode on the first dielectric substrate.

17. The phase shifter of claim 1, wherein the second electrode comprises the first sub-electrode and the second sub-electrode which are staggered in the first direction, and orthographic projections of the first sub-electrode and the second sub-electrode, which are adjacent to each other, on the first dielectric substrate are partially overlapped.

18. The phase shifter of claim 1, wherein orthographic projections of the first electrode and the second electrode on the first dielectric substrate are arranged side by side in a second direction, each of the first electrode and the second electrode comprises the first sub-electrode and the second sub-electrode which are arranged in a staggered manner along the first direction, and in the first direction, orthographic projections of the first sub-electrode and the second sub-electrode, which are adjacent to each other, on the first dielectric substrate are partially overlapped.

19. The phase shifter of claim 1, wherein the first electrode includes the first sub-electrode and the second sub-electrode staggered in the first direction, and in the first direction, orthographic projections of the first sub-electrode and the second sub-electrode, which are adjacent to each other, on the first dielectric substrate are partially overlapped.

* * * * *